United States Patent
Fukushima et al.

(10) Patent No.: US 11,139,536 B2
(45) Date of Patent: Oct. 5, 2021

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Osamu Nakayama, Mie (JP); Katsushi Miyazaki, Mie (JP); Seishi Kimura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 133 days.

(21) Appl. No.: 16/464,967

(22) PCT Filed: Feb. 13, 2018

(86) PCT No.: PCT/JP2018/004799
§ 371 (c)(1),
(2) Date: May 29, 2019

(87) PCT Pub. No.: WO2018/155249
PCT Pub. Date: Aug. 30, 2018

(65) Prior Publication Data
US 2020/0020914 A1 Jan. 16, 2020

(30) Foreign Application Priority Data
Feb. 21, 2017 (JP) .............................. JP2017-029749

(51) Int. Cl.
*H01M 50/20* (2021.01)
*H01M 50/502* (2021.01)

(52) U.S. Cl.
CPC ......... *H01M 50/502* (2021.01); *H01M 50/20* (2021.01); *H01M 2220/20* (2013.01)

(58) Field of Classification Search
None
See application file for complete search history.

(56) References Cited

U.S. PATENT DOCUMENTS

| 2014/0065885 A1* | 3/2014 | Nakayama | H01M 10/482 |
| | | | 439/627 |
| 2015/0070025 A1 | 3/2015 | Nakayama et al. | |

(Continued)

FOREIGN PATENT DOCUMENTS

| JP | 2012-256538 | 12/2012 |
| JP | 2014-007105 | 1/2014 |

(Continued)

OTHER PUBLICATIONS

Official Communication issued in International Bureau of WIPO Patent Application No. PCT/JP2018/004799, dated Mar. 27, 2018.

*Primary Examiner* — Jonathan Crepeau
*Assistant Examiner* — Angela J Martin
(74) *Attorney, Agent, or Firm* — Greenblum & Bernstein, P.L.C.

(57) ABSTRACT

A connection module includes a busbar holding module, and an external connection busbar holding portion that is disposed on the busbar holding module. The busbar holding module includes an insulating protector configured to hold a plurality of busbars. The external connection busbar holding portion includes a first external connection busbar having an elongated shape, a second external connection busbar to which an external connection component is to be bolted, and an external connection busbar protector. The insulating (Continued)

protector includes a first engaging portion configured to be engaged with the external connection busbar protector, and the external connection busbar protector includes a first engaged portion configured to be engaged with the first engaging portion.

7 Claims, 12 Drawing Sheets

(56) References Cited

U.S. PATENT DOCUMENTS

2016/0197330 A1* 7/2016 Takase .................. B60R 16/033
                                                                429/92
2017/0328783 A1    11/2017 Okamoto et al.

FOREIGN PATENT DOCUMENTS

| JP | 2014-127229 | 7/2014 |
| JP | 2016-122577 | 7/2016 |
| JP | 2017-027926 | 2/2017 |

* cited by examiner

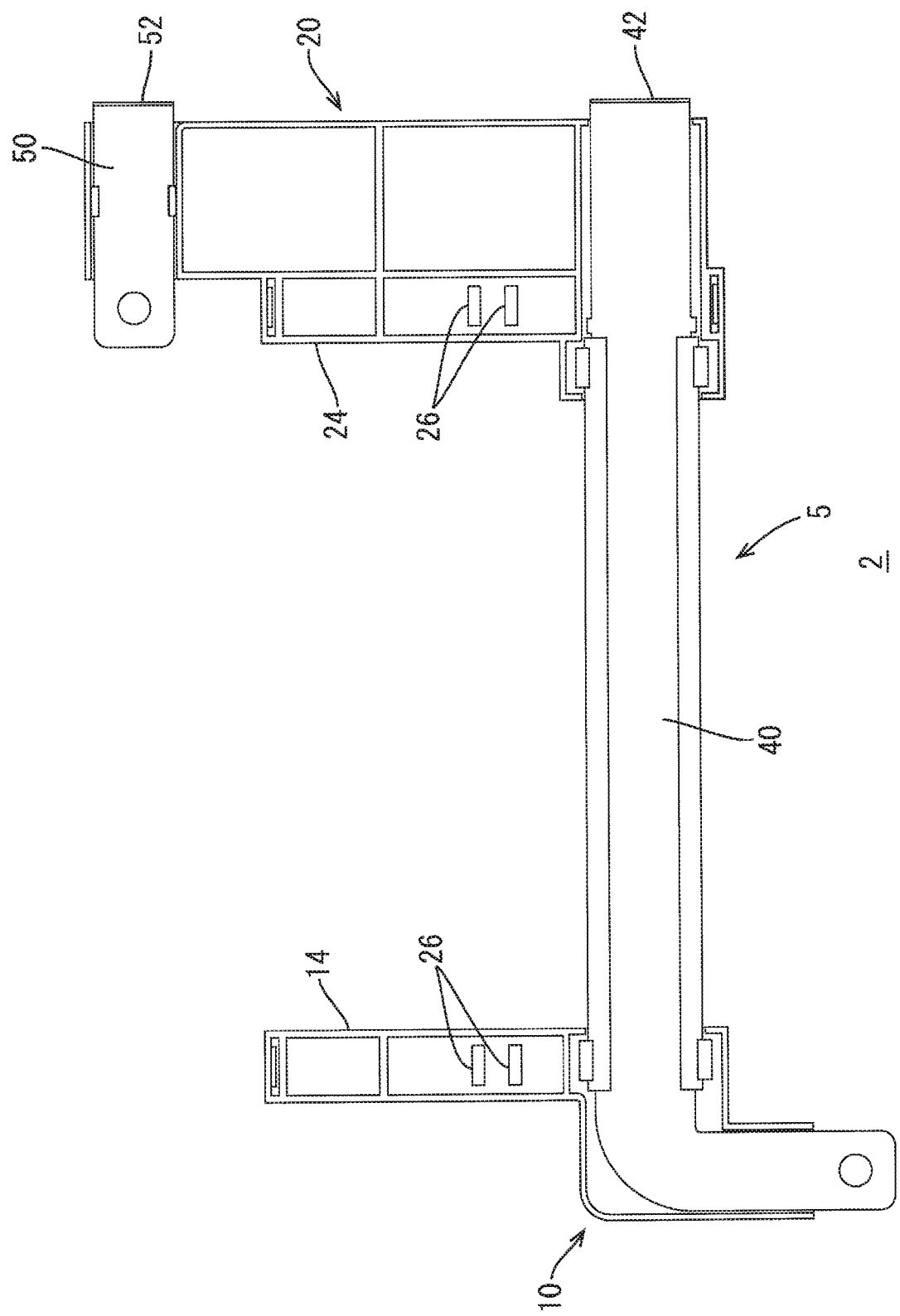

CONNECTION MODULE

TECHNICAL FIELD

The technique disclosed herein relates to a connection module, and more particularly relates to a connection module including an external connection busbar holding portion that holds external connection busbars that are connected to a pair of output electrode terminals for outputting power to the outside of an electricity storage element group.

BACKGROUND ART

Conventionally, as external connection busbars that are connected to output electrode terminals of an electricity storage element group, the external connection busbars described in Patent Document 1 are known, for example. Patent Document 1 describes, in a battery module (electricity storage module) M1 that has a configuration in which a pair of output electrode terminals are used as electrode terminals of electricity storage elements at opposite ends of an electricity storage element group, external connection busbars 19B that are connected to the electrode terminals of the electricity storage elements at the opposite ends. In this configuration, the external connection busbars 19B are held by a resin protector 20, together with busbars 19 that connect the electrode terminals of the electricity storage elements.

CITATION LIST

Patent Document

Patent Document 1: JP 2014-127229A

SUMMARY OF INVENTION

Technical Problem

However, when the arrangement of a plurality of electricity storage elements of the electricity storage element group is the same as that of Patent Document 1 above, or in other words, when electricity storage elements having the shape of a solid rectangular with a small thickness are arranged in the thickness direction, the supply of power from the electricity storage element group to an external device through the external connection busbars may be carried out from the same end side of the electricity storage element group. In this case, the external connection busbar that is connected to one of a pair of output electrode terminals needs to be disposed over a long distance to the other end of the electricity storage element group. That is, an elongated external connection busbar and a holding member that holds the elongated external connection busbar are required.

In addition, it is often the case that an external connection component such as an external device connection busbar for connecting an external connection busbar to an external device to which the power from the electricity storage element group is supplied is bolted to each of the external connection busbars. In this case, as the external connection component is bolted to the external connection busbar that is connected to the other output electrode terminal, a torque load resulting from rotating a bolt is applied, via the holding member, to the connection portion between the elongated external connection busbar and the output electrode terminal. Such a torque load may affect the reliability of connection between the elongated external connection busbar and the output electrode terminals of the electricity storage element group.

The technique disclosed herein has been completed in light of the above-described circumstances, and provides a connection module that can maintain the reliability of connection between an elongated external connection busbar and the output electrode terminals of an electricity storage element group.

Solution to Problem

A connection module disclosed herein is directed to a connection module that is to be attached to an electricity storage element group including a plurality of electricity storage elements each including positive and negative electrode terminals, the electricity storage element group including a first output electrode terminal for outputting power of one polarity, and a second output electrode terminal for outputting power of the other polarity, the connection module including: a busbar holding module including a plurality of busbars configured to connect the positive electrode terminal and the negative electrode terminal of adjacent ones of the electricity storage elements to each other, and an insulating protector configured to hold the plurality of busbars; and an external connection busbar holding portion that is disposed above the busbar holding module, wherein the external connection busbar holding portion includes: a first external connection busbar having an elongated shape, and having one end that is to be connected to the first output electrode terminal, and another end to which an external connection component is to be connected; a second external connection busbar having one end that is to be connected to the second output electrode terminal, and another end to which an external connection component is to be bolted; an external connection busbar protector configured to hold the first external connection busbar and the second external connection busbar, the insulating protector includes a first engaging portion configured to be engaged with the external connection busbar protector, and the external connection busbar protector includes a first engaged portion configured to be engaged with the first engaging portion.

With the present configuration, in a configuration in which the external connection component is bolted to the other end of the second external connection busbar that is held in the external connection busbar protector, the first engaging portion that is engaged with the first engaged portion is disposed on the insulating protector of the external connection busbar protector. Accordingly, even when a torque load is generated as the external connection component is bolted to the other end of the second external connection busbar, it is possible to keep the external connection busbar protector from being moved by the rotational force resulting from the torque load. This makes it possible to keep the torque load from affecting the elongated first external connection busbar via the external connection busbar protector. Consequently, it is possible to maintain the reliability of connection between the elongated external connection busbar and the output electrode terminal of the electricity storage element group.

In the above-described connection module, the first engaged portion may have a locking hole, and the first engaging portion may be formed by a protruding pawl portion configured to pass through the locking hole, and to be locked to the external connection busbar protector.

With the present configuration, the first engaging portion and the first engaged portion for engaging the external connection busbar protector with the busbar holding module can be realized with a simple configuration.

In the above-described connection module, the external connection busbar protector may include: a first protector portion configured to hold the one end of the first external connection busbar; and a second protector portion configured to hold the other end of the first external connection busbar at one end portion thereof in a direction perpendicular to a direction of arrangement of the plurality of electricity storage element, and to hold the second external connection busbar at another end portion thereof in the perpendicular direction, the first engaging portion may be engaged with the second protector portion, and the second protector portion may include the first engaged portion.

With the present configuration, in a configuration in which the external connection component is bolted to the other end of the second external connection busbar that is held by the second protector portion, the first engaging portion of the insulating protector is engaged with the first engaged portion of the second protector portion. Accordingly, even when a torque load is generated as the external connection component is bolted to the other end of the second external connection busbar, it is possible to keep the second protector portion from being moved by the rotational force resulting from the torque load. Consequently, it is possible to keep the torque load from affecting the elongated first external connection busbar via the second protector portion.

In the above-described connection module, the first engaging portion may be disposed between the first external connection busbar and the second external connection busbar in a state in which the external connection busbar holding portion is disposed above the busbar holding module, and the second protector portion may include a first locking piece configured to be engaged with a locking groove formed on one of the electricity storage elements.

With the present configuration, the second protector portion is engaged with the electricity storage element by using the first locking piece. Accordingly, it is possible to further keep the torque load from affecting the elongated first external connection busbar via the second protector portion.

In the above-described connection module, the first protector portion may include a second locking piece configured to be engaged with a locking groove formed in one of the electricity storage elements.

With the present configuration, the first protector portion is engaged with the electricity storage element by the second locking piece. Accordingly, the stability of the connection portion between the first external connection busbar and the first output electrode terminal is increased. This increases the reliability of connection between the first external connection busbar and the first output electrode terminal.

In the above-described connection module, the insulating protector may include a second engaging portion configured to be engaged with the first protector portion, and the first protector portion may include a second engaged portion configured to be engaged with the second engaging portion.

With the present configuration, the first protector portion is engaged with the busbar holding module by engagement between the second engaging portion and the second engaged portion. Accordingly, the influence of the torque load on the connection portion between the first external connection busbar and the first output electrode terminal is further reduced. This further increases the reliability of connection between the first external connection busbar and the first output electrode terminal.

In the above-described connection module, the external connection busbar protector may include an intermediate protector portion configured to hold the first external connection busbar, the first protector portion, the second protector portion, and the intermediate protector portion may be separate members, and the external connection busbar protector may be formed as one piece by the first protector portion and the second protector portion being coupled by the intermediate protector portion.

With the present configuration, the first protector portion, the second protector portion, and the intermediate protector portion are formed by separate members. Accordingly, the external connection busbar protector can be adapted to electricity storage element groups having different numbers of electricity storage elements by simply making a design change in the length of the intermediate protector portion, without changing the designs of the first protector portion and the second protector portion.

Advantageous Effects of Invention

With the connection module disclosed herein, it is possible to maintain the reliability of connection between an elongated external connection busbar and the output electrode terminals of an electricity storage element group.

BRIEF DESCRIPTION OF DRAWINGS

FIG. 12 is a plan view showing another example of the external connection busbar holding portion.

DESCRIPTION OF EMBODIMENTS

Embodiments

Figure 1:
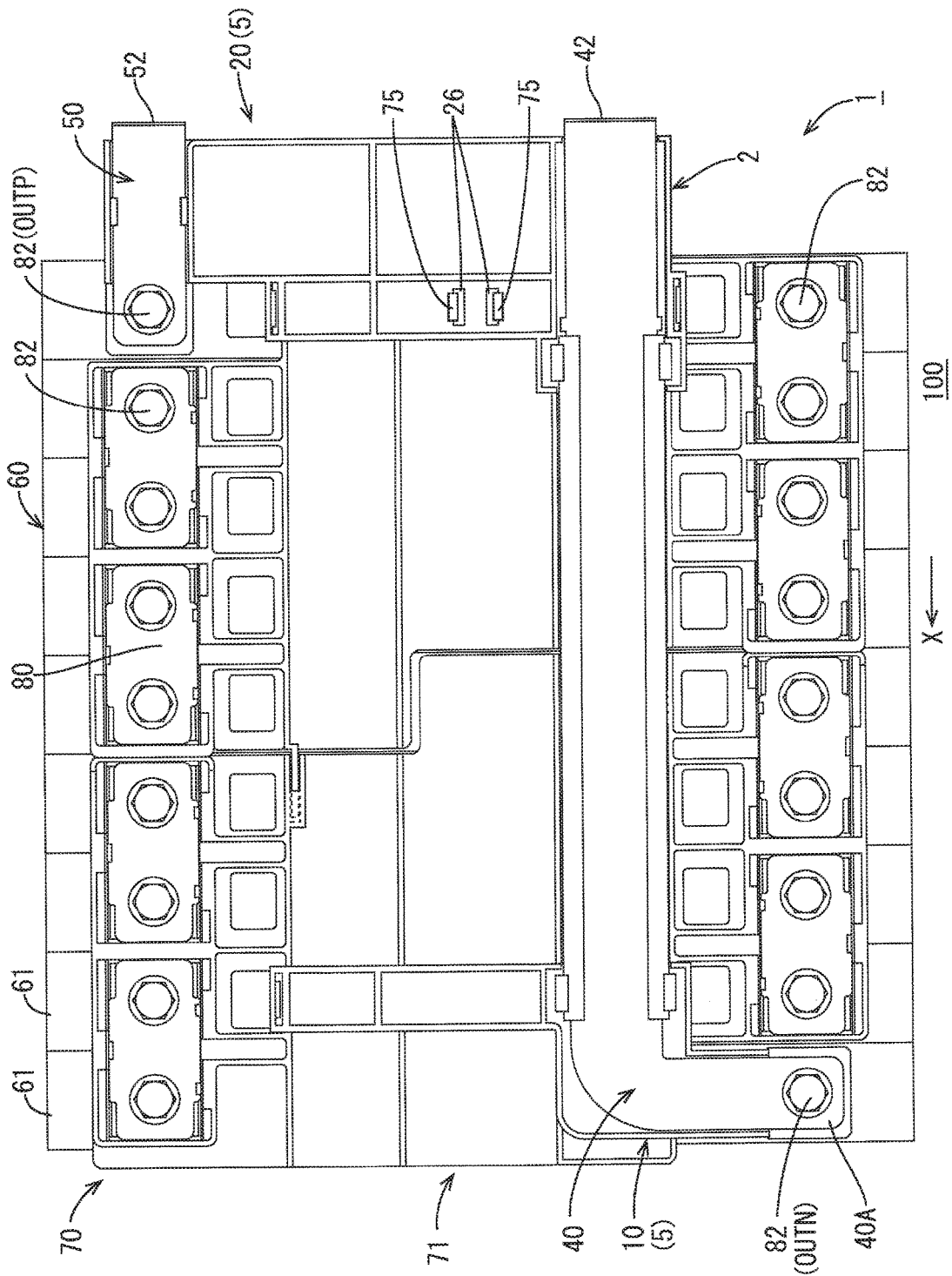
FIG. 1 is a plan view of an electricity storage module including a connection module according to an embodiment.
Figure 2:
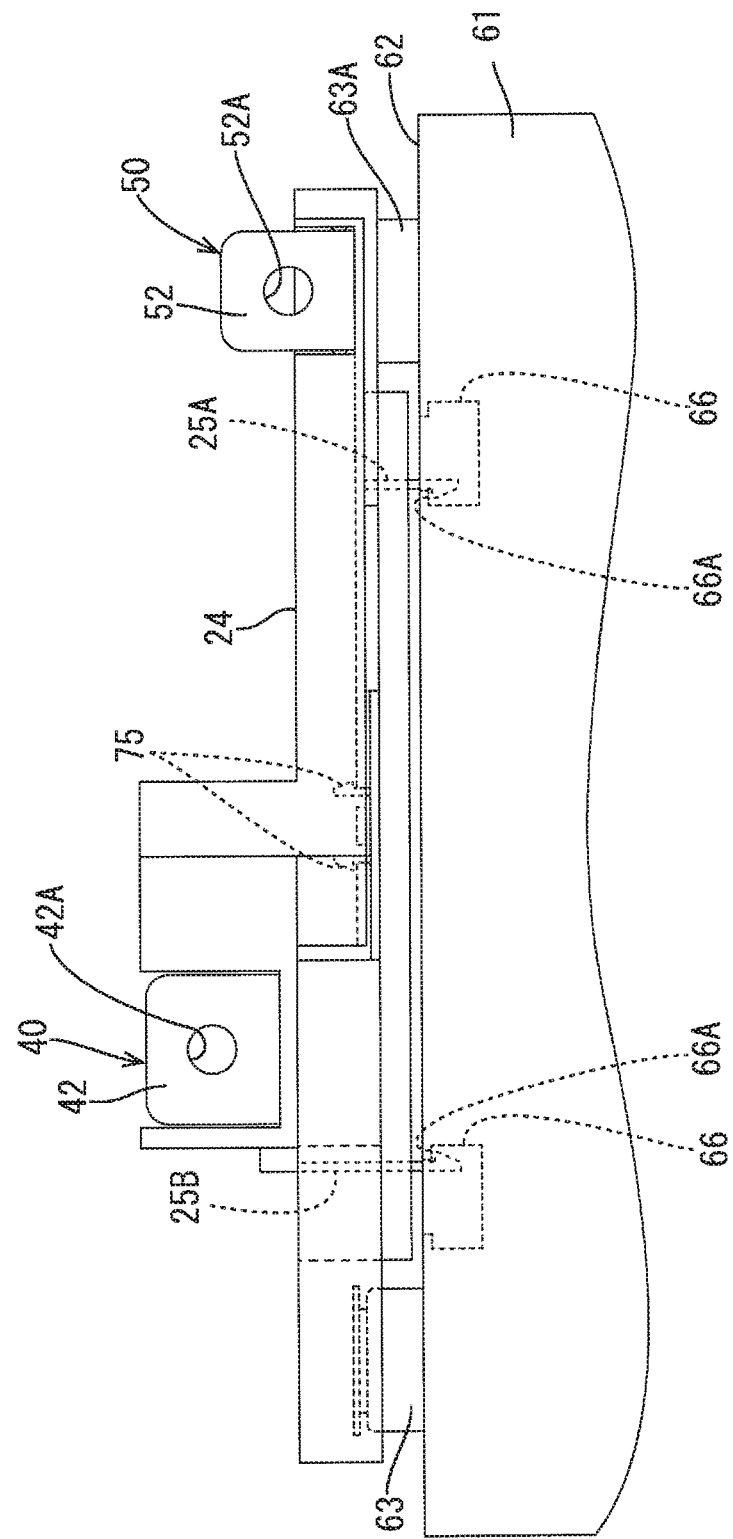
FIG. 2 is a side view of the electricity storage module.
Figure 3:
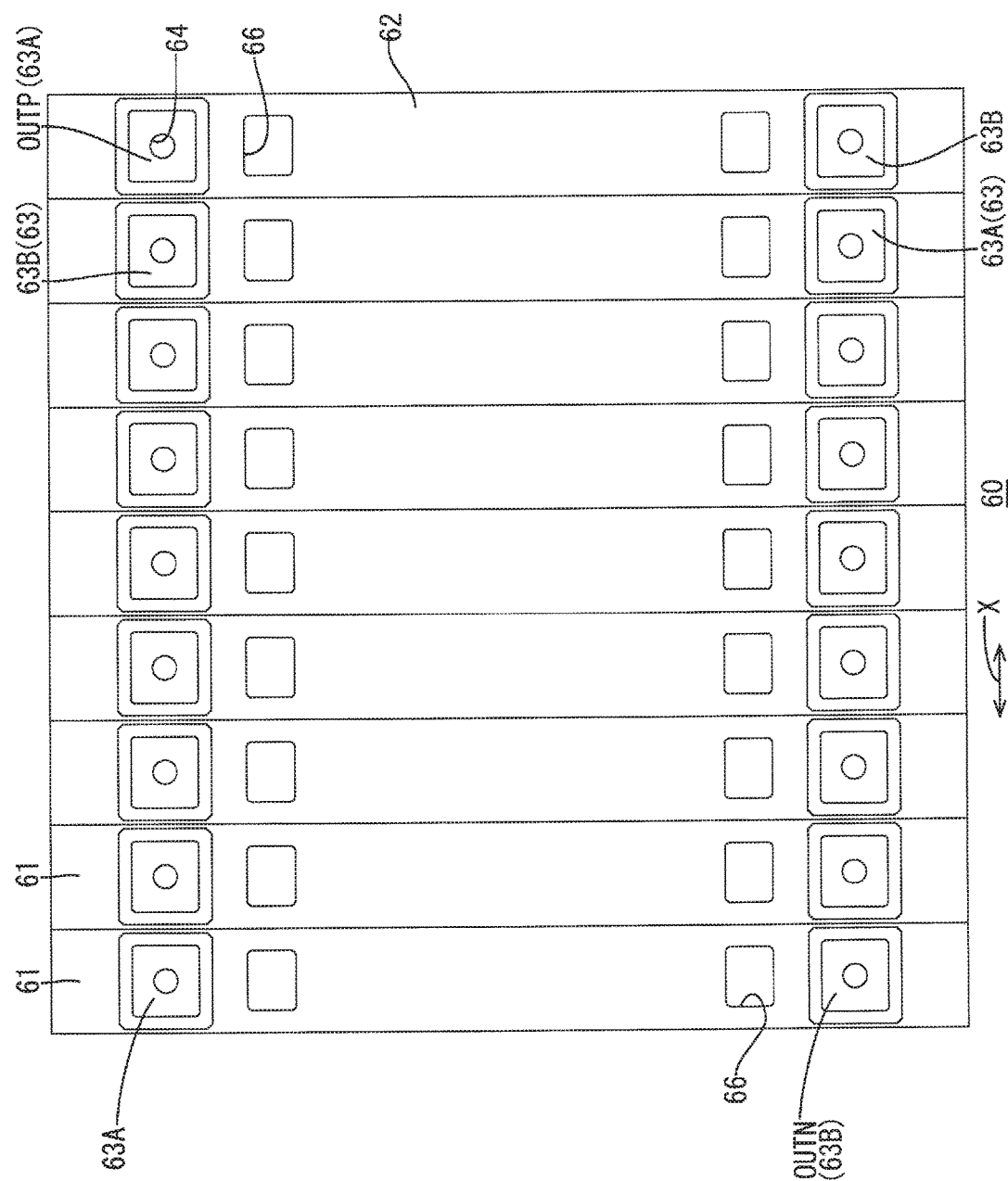
FIG. 3 is a plan view of an electricity storage element group.

An embodiment will be described with reference to FIGS. 1 to 10. Note that FIG. 10 is a cross-sectional view taken along the line A-A in FIG. 8. The following description will be given, assuming that the direction indicated by the arrow X in FIGS. 1 and 3 is the left direction, and the direction indicated by the arrow Y in FIG. 2 is the upper direction. For a plurality of identical members, a reference numeral may be assigned to one member, and reference numerals omitted for the other members.

An electricity storage module 100 described in the present embodiment can be mounted on a vehicle (not shown) such as an electric car or a hybrid car, and used as a power source for driving the vehicle, for example.

1. Configuration of Electricity Storage Module

As shown in FIGS. 1 and 2, the electricity storage module 100 of the present embodiment is mainly composed of an electricity storage element group 60 (see FIG. 3) formed by arranging a plurality of (in the present embodiment, nine) electricity storage elements 61, and a connection module 1 attached to the electricity storage element group 60. In the following, the electricity storage element group 60 will be described briefly.

1-1. Electricity Storage Element Group and Electricity Storage Elements

Each electricity storage element 61 according to the present embodiment may be a secondary battery, for example. As shown in FIG. 3, a plurality of electricity storage elements 61 are arranged in a row, and form the electricity storage element group 60.

Each of the electricity storage elements 61 has the shape of a solid rectangular with a flat contour, and has an electrode arrangement surface 62 that is perpendicular to a surface thereof opposing an adjacent electricity storage element 61, as shown in FIG. 3. A pair of electrode terminals 63 are disposed on the electrode arrangement surface 62 at positions near opposite end portions in the longitudinal direction thereof. One of the electrode terminals 63 is a positive electrode terminal 63A and the other is a negative electrode terminal 63B. Each of the electrode terminals 63 is made of metal, and protrudes in a rectangular tubular shape from the electrode arrangement surface 62 (see FIG. 2). A bolt hole 64 to which a bolt 82 (see FIG. 1) is coupled is formed in each of the electrode terminals 63.

Locking grooves 66 with which a locking piece 15 (an example of a "second locking piece") of a first protector portion 10 and locking pieces 25A and 25B (an example of a "first locking piece") of a second protector portion 20, which will be described below, are to be engaged are provided in the electrode arrangement surfaces 62 of the electricity storage elements 61, in the vicinity of the pair of electrode terminals 63. Each locking groove 66 has a rectangular opening, and has a form that is depressed in a recess shape from the electrode arrangement surface 62 (see FIGS. 2 and 3). Each locking groove 66 includes a locking portion 66A for locking the locking pieces 15, 25A, and 25B (see FIG. 2). As a result of each of the locking pieces 15, 25A, and 25B being locked by the locking portion 66A, the external connection busbar holding portion 2 is attached to the upper portion of the electricity storage element group 60.

The plurality of electricity storage elements 61 are arranged such that electrode terminals 63 of different polarities are disposed adjacent to each other in two adjacent electricity storage elements 61 (i.e., the positive electrode terminal 63A of one electricity storage element 61 and the negative electrode terminal 63B of another electricity storage element 61 adjacent thereto are disposed adjacent to each other). Also, as shown in FIG. 3, in the present embodiment, the negative electrode terminal 63B of the electricity storage element 61 at the left end is used as a negative electrode output terminal OUTN, and the positive electrode terminal 63A of the electricity storage element 61 at the right end is used as a positive electrode output terminal OUTP.

2. Connection Module

As shown in FIG. 1, the connection module 1 includes a busbar holding module 70 and an external connection busbar holding portion 2, and is attached to the upper portion of the electricity storage element group 60 (see FIG. 2).

2-1. Configuration of Busbar Holding Module

Figure 4:
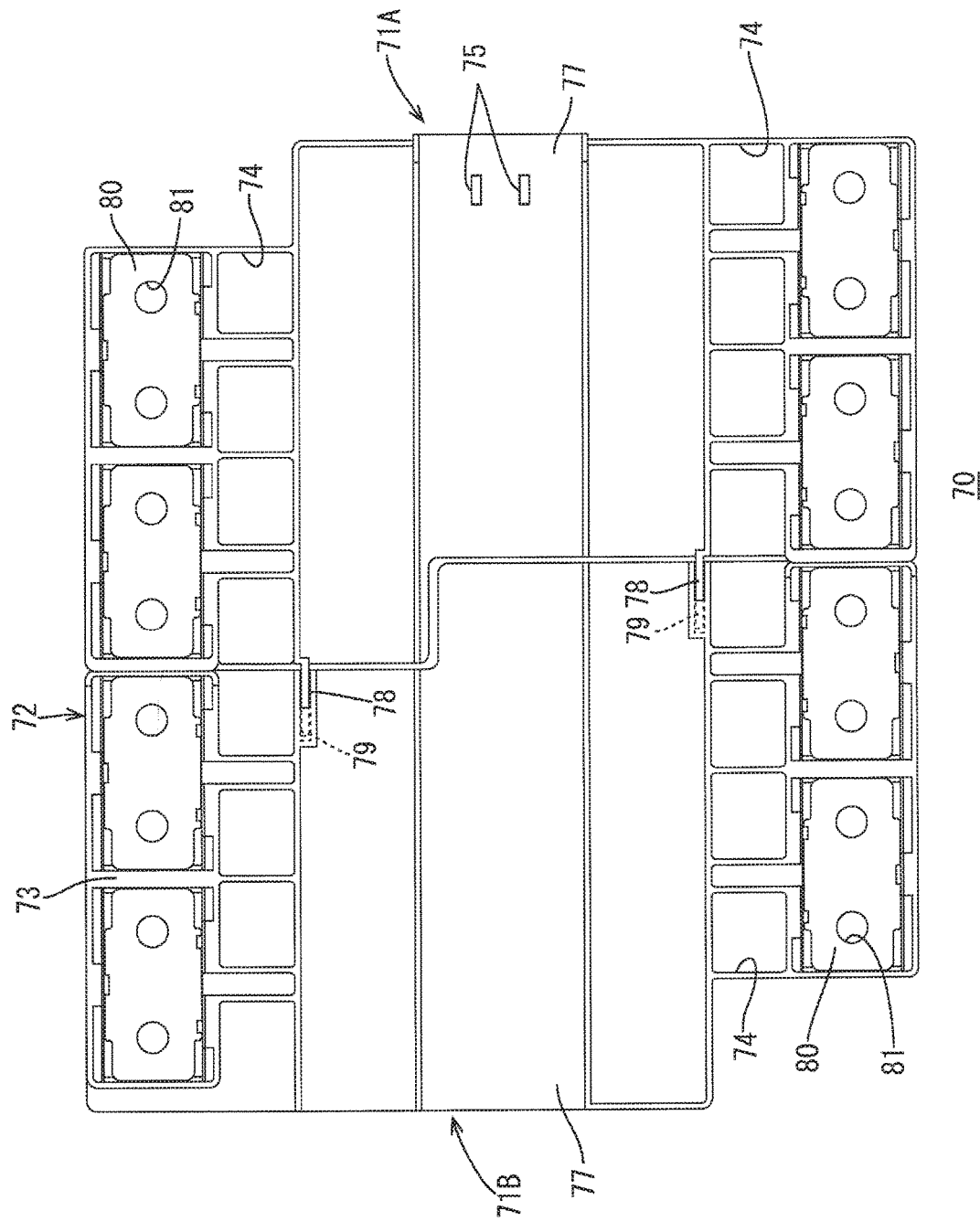
FIG. 4 is a plan view of a busbar holding module.

The busbar holding module 70 is a member that is mounted to a surface formed by the electrode arrangement surfaces 62 of the electricity storage elements 61 in the electricity storage element group 60. As shown in FIG. 4, the busbar holding module 70 includes, for example, two insulating protectors 71A and 71B, and a plurality of busbars 80 that are held by the insulating protectors 71, and connect the positive electrode terminal 63A and the negative electrode terminal 63B of adjacent electricity storage elements 61 to each other, a voltage detection terminal (not shown) that is disposed on top of each busbar 80 and electrically connected to the busbar 80, and a detection wire (not shown) that is connected to each voltage detection terminal.

Each busbar 80 is formed by punching a metal plate, and constitutes a plate-shaped member that has a substantially rectangular shape as a whole and whose four corners have been cut out into a flat rectangular shape, as shown in FIG. 4. Two connection holes 81 for coupling the bolts 82 (see FIG. 1) to the bolt holes 64 of the electricity storage elements 61 are formed in each busbar 80. Examples of the material of the busbar 80 include copper, a copper alloy, aluminum, an aluminum alloy, and stainless steel (SUS).

In the present embodiment, two insulating protectors (71A, 71B) are arranged along the direction in which the plurality of electricity storage elements 61 are arranged. Each of the insulating protectors 71 is formed by an insulating member made of a synthetic resin or the like. Note that the number of insulating protectors 71 is not limited to two. The number of insulating protectors 71, or in other words, the number of divisions of the insulating protectors 71 may be determined as appropriate according to the size of the electricity storage element group 60, i.e., the number of the electricity storage elements 61.

As shown in FIG. 4, each of the insulating protectors 71 includes, for example, a plurality of (in the present embodiment, four) busbar holding portions 72 that are open in the vertical direction and accommodate and hold the busbars 80, and opening portions 74 for engaging the locking pieces 15, 25A, and 25B of the external connection busbar holding portion 2 with the locking grooves 66 of the electricity storage elements 61. The busbar holding portions 72 are provided so as to correspond to the electrode terminals 63 of the electricity storage elements 61, and to be separated at opposite end portions of each of the insulating protector 71 in a direction perpendicular to the direction of arrangement (the arrow X direction) of the electricity storage elements. The separated busbar holding portions 72 are coupled by a coupling portion 77.

Each busbar holding portion 72 has a rectangular tubular accommodating wall 73 that holds the busbars 80 therein such that adjacent busbars 80 are insulated from each other. The accommodating wall 73 also functions as a protection wall for adjacent electrode terminals 63. In addition, each insulating protector 71 is provided with an engaging portion 78 and an engagement receiving portion 79 for coupling with the insulating protector 71 adjacent thereto.

Figure 5:
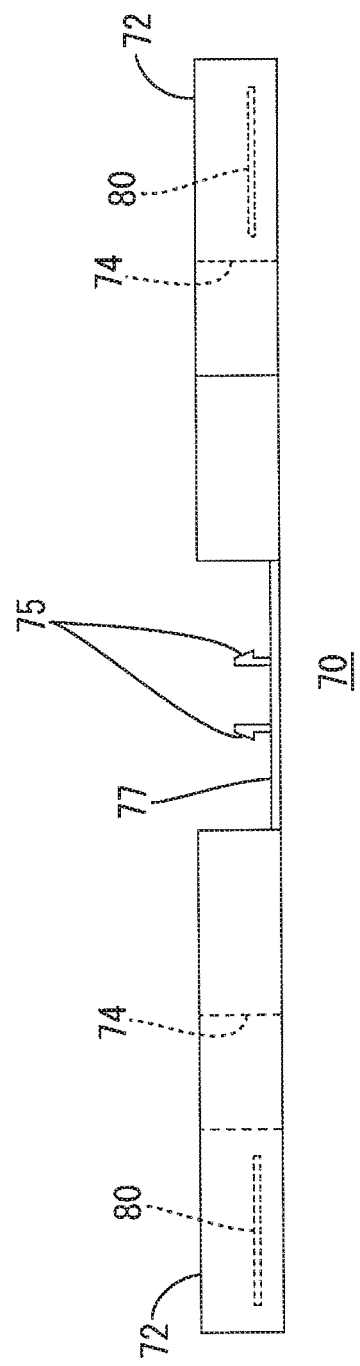
FIG. 5 is a side view of the busbar holding module.

As shown in FIG. 5, a pair of protruding pawl portions 75 are formed at the central portion of the coupling portion 77 of one insulating protector 71A. In the present embodiment, in a state in which the external connection busbar holding portion 2 is disposed on the busbar holding module 70, the pair of protruding pawl portions 75 are disposed at positions closer to the negative electrode external connection busbar 40 than to the positive electrode external connection busbar 50 that are held by the external connection busbar holding portion 2, as shown in FIGS. 1 and 2. Note that the arrangement positions of the pair of protruding pawl portions 75 are not limited thereto. For example, the arrangement positions of the pair of protruding pawl portions 75 may simply be positions close to the negative electrode external connection busbar 40, or may simply be positions close to the positive electrode external connection busbar 50.

The pair of protruding pawl portions 75 pass through a pair of locking holes 26 of the second protector portion 20, which will be described below, of the external connection busbar holding portion 2, and are locked to the second protector portion 20. Consequently, the second protector portion 20 is engaged with the insulating protector 71A. The protruding pawl portions 75 are an example of a "first engaging portion".

2-2. Configuration of External Connection Busbar Holding Portion

Figure 6:
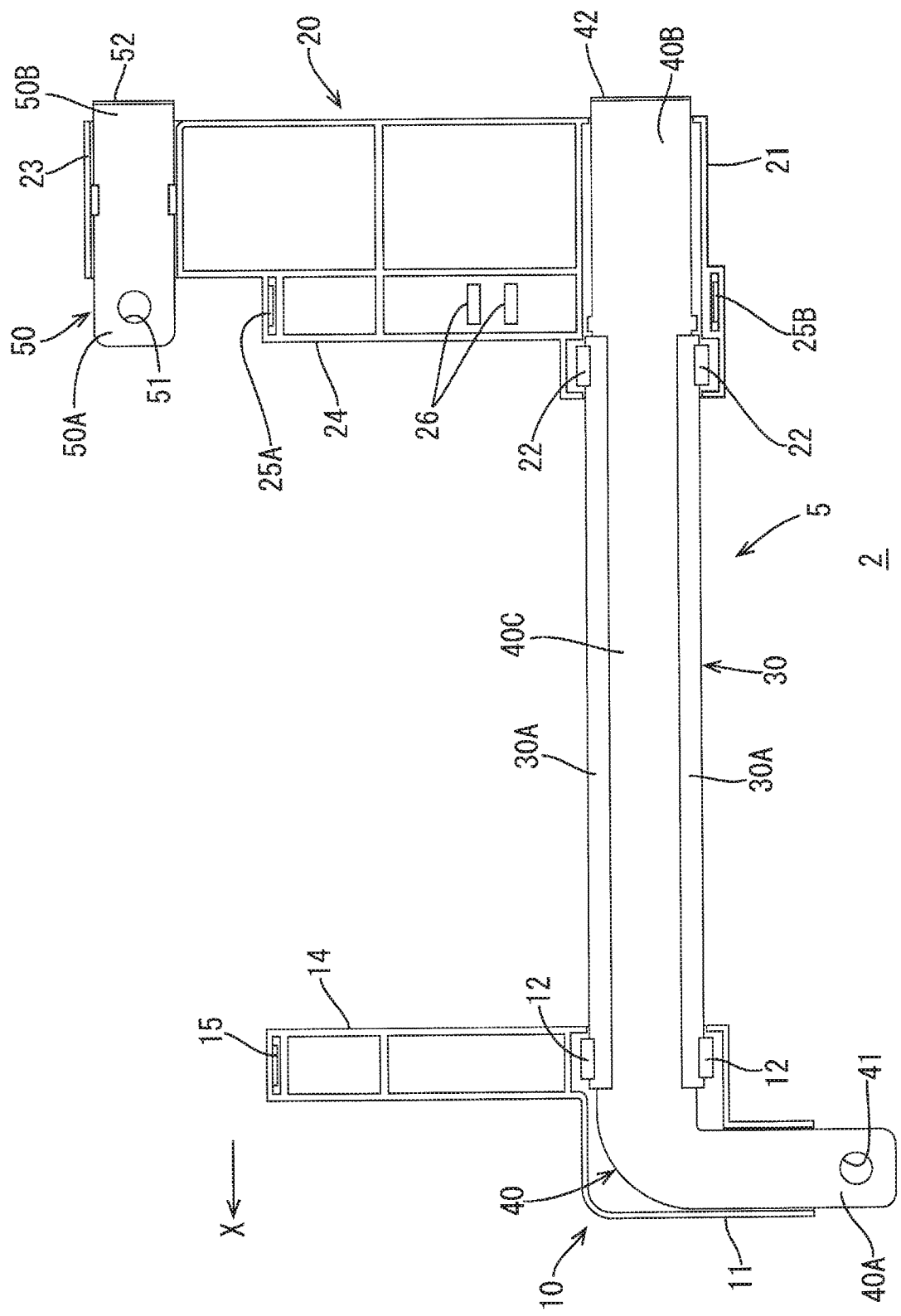
FIG. 6 is a plan view of an external connection busbar holding portion.
Figure 7:
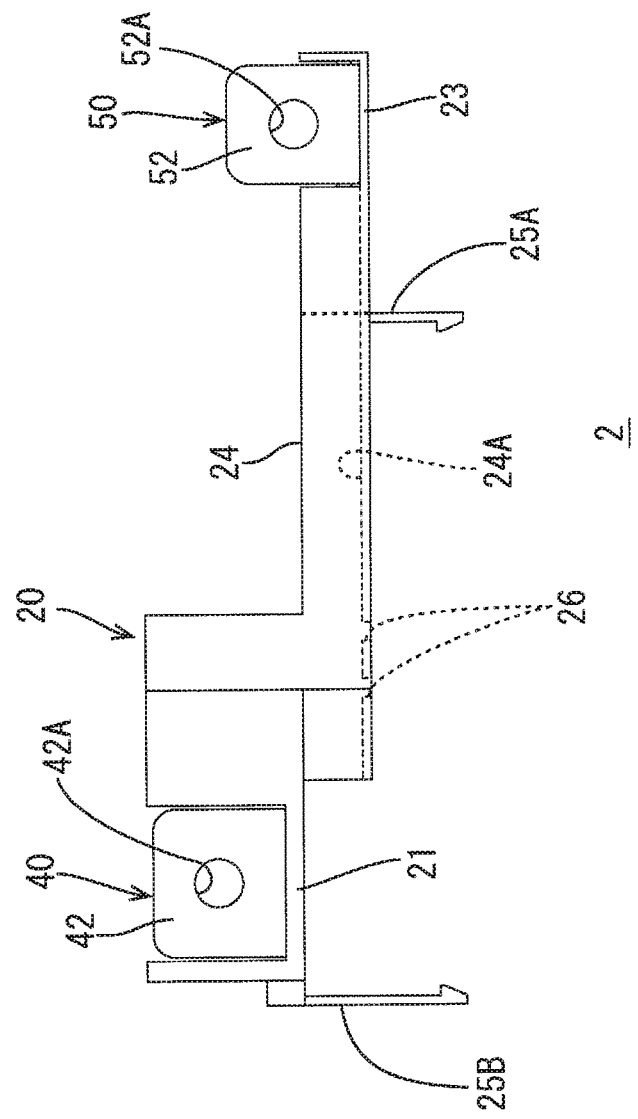
FIG. 7 is a side view of the external connection busbar holding portion.

As shown in FIG. 6, the external connection busbar holding portion 2 includes an external connection busbar protector 5, a negative electrode external connection busbar (an example of a "first external connection busbar") 40, and a positive electrode external connection busbar (an example of a "second external connection busbar") 50. The external connection busbar protector 5 includes a first protector portion 10, a second protector portion 20, and an intermediate protector portion 30 that are formed separately. The first protector portion 10 and the second protector portion 20 are integrated as one piece by being coupled by the intermediate protector portion 30.

The negative electrode external connection busbar 40 is connected to the negative electrode output terminal OUTN (see FIG. 1) of the electricity storage element group 60, out of the pair of output electrode terminals (OUTP and OUTN) for outputting power to the outside.

The negative electrode external connection busbar 40 is a thin plate extending in the direction of arrangement of the plurality of electricity storage elements 61 (the arrow X direction in FIG. 6), and has an elongated shape. More specifically, as shown in FIG. 6, the negative electrode external connection busbar 40 includes a first electrode connection portion 40A that is connected to the negative electrode output terminal OUTN of the electricity storage element group 60, a first external connection portion 40B that is connected to an external device to which power is supplied from the electricity storage element group 60, and an intermediate portion 40C located between the first electrode connection portion 40A and the first external connection portion 40B. As shown in FIG. 6, the intermediate portion 40C has a shape extending from the first electrode connection portion 40A to the first external connection portion 40B.

A through hole 41 for connecting the negative electrode external connection busbar 40 to the negative electrode output terminal OUTN is formed in the first electrode connection portion 40A. A first connection terminal portion 42 for connecting the negative electrode external connection busbar 40 to an external device connection busbar (an example of an "external connection component") 92 is formed at the first external connection portion 40B so as to be bent in the vertical direction. A through hole 42A for enabling connection of the external device connection busbar 92 is formed in the first connection terminal portion 42 (see FIG. 7).

Figure 8:
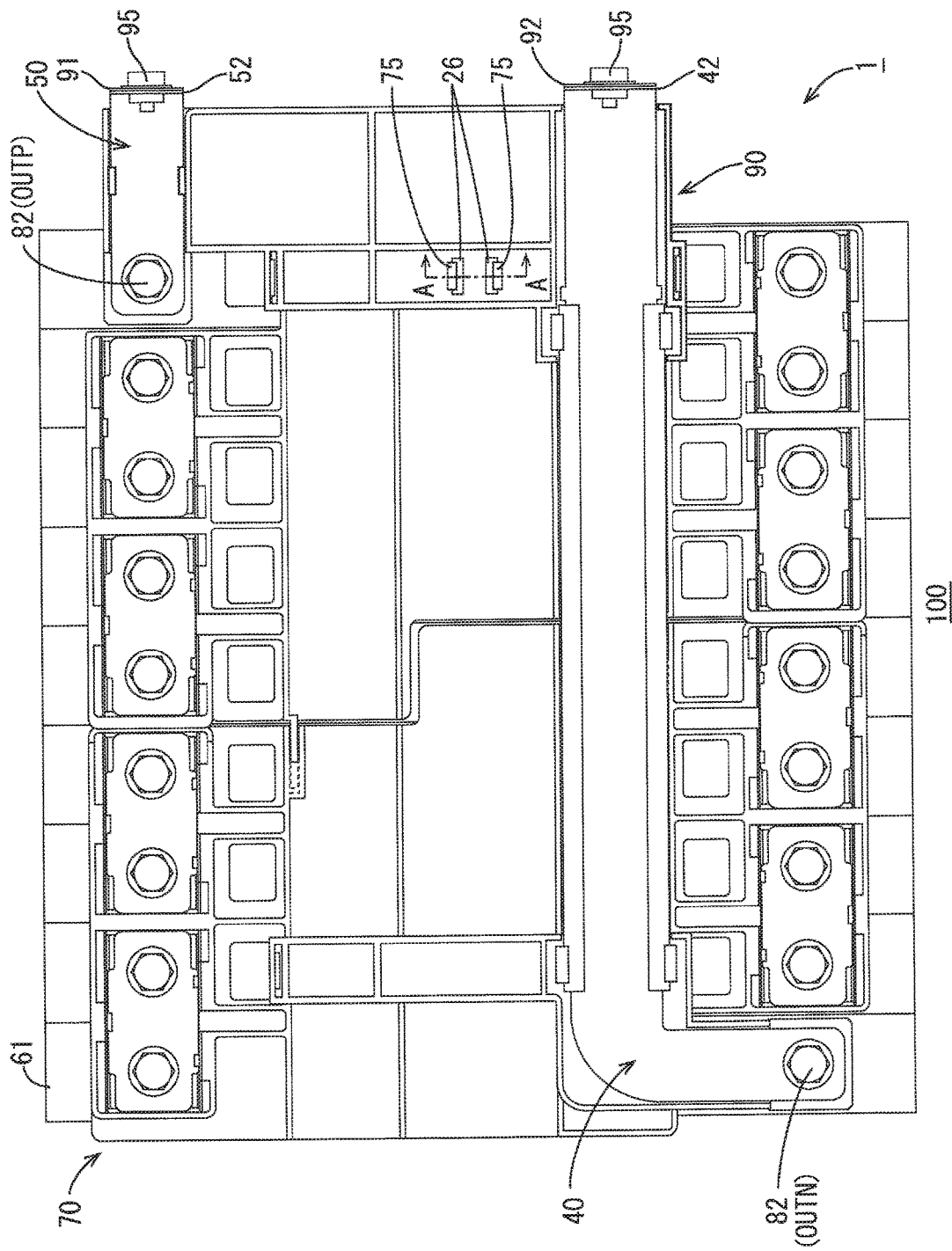
FIG. 8 is a plan view showing a state in which external device connection busbars are bolted to the electricity storage module.

That is, as shown in FIG. 6, the negative electrode external connection busbar 40 has a shape extending in the direction in which the plurality of electricity storage elements are arranged, the first electrode connection portion 40A, which is one end of the negative electrode external connection busbar 40, is connected to the negative electrode output terminal OUTN (first output electrode terminal), and the first external connection portion 40B, which is the other end thereof, more specifically, the first connection terminal portion 42 of the first external connection portion 40B, is bolted to the external device connection busbar 92 (see FIG. 8). The negative electrode external connection busbar 40 is an example of a "first external connection busbar".

As shown in FIG. 6, the positive electrode external connection busbar 50 includes a second electrode connection portion 50A that is connected to the positive electrode output terminal OUTP of the electricity storage element group 60, and a second external connection portion 50B that is connected to the external device to which power is supplied from the electricity storage element group 60. A through hole 51 for connecting the positive electrode external connection busbar 50 to the positive electrode output terminal OUTP is formed in the second electrode connection portion 50A.

As shown in FIG. 6, a second connection terminal portion 52 for connecting the positive electrode external connection busbar 50 to the external device is formed bent in the vertical direction at the second external connection portion 50B. A through hole 52A for enabling connection of an external device connection busbar 91 is formed in the second connection terminal portion 52 (see FIG. 7).

That is, the second electrode connection portion 50A, which is one end of the second external connection busbar 50, is connected to the positive electrode output terminal OUTP (the second output electrode terminal), and the second external connection portion 50B, which is the other end thereof, more specifically, the second connection terminal portion 52 of the second external connection portion 50B, is bolted to the external device connection busbar 91 (see FIG. 8). The positive electrode external connection busbar 50 is an example of a "second external connection busbar".

Note that the arrangement is not limited thereto, and may be reversed, i.e., the "first external connection busbar" may be used as the positive electrode external connection busbar, and the "second external connection busbar" may be used as the negative electrode external connection busbar. That is, according to the arrangement of the electricity storage elements 61 of the electricity storage element group 60, the first external connection busbar 40 may be used as the positive electrode external connection busbar, and the second external connection busbar 50 may be used as the negative electrode external connection busbar.

The first protector portion 10 is formed by an insulating member made of a synthetic resin or the like, and, includes, for example, a busbar holding portion 11, a first locking portion 12, an extending portion 14, and a locking piece 15 as shown in FIG. 6.

The busbar holding portion 11 holds the first electrode connection portion 40A, which is one end of the negative electrode external connection busbar 40, in an insulated manner. More specifically, the busbar holding portion 11 also holds a portion of the intermediate portion 40C of the negative electrode external connection busbar 40.

As shown in FIG. 6, a pair of first locking portions 12 are provided corresponding to the width of the intermediate protector portion 30, and lock the negative electrode external connection busbar 40 via the intermediate protector portion 30.

The extending portion 14 is provided extending from the busbar holding portion 11 in the width direction of the intermediate portion 40C of the negative electrode external connection busbar 40, or in other words, a direction perpendicular to the direction of arrangement of the electricity storage elements, and a locking piece 15 is formed at the distal end portion of the extending portion 14. The locking piece 15 couples the first protector portion 10, or in other words, the external connection busbar holding portion 2 to the electricity storage element group 60 by being engaged with the corresponding one of the above-described locking grooves 66 (see FIG. 2) formed in the electricity storage elements 61.

Similarly to the first protector portion 10, the second protector portion 20 is formed by an insulating member made of a synthetic resin or the like, and includes, for example, a first busbar holding portion 21, second locking portions 22, a second busbar holding portion 23, an extending portion 24, and two locking pieces 25A and 25B as shown in FIG. 6. As shown in FIG. 6, the second protector portion 20 is disposed at a predetermined distance from the first protector portion 10.

The first busbar holding portion 21 holds the first external connection portion 40B, which is the other end portion of the negative electrode external connection busbar 40, in an insulated manner. More specifically, the first busbar holding portion 21 also holds a portion of the intermediate portion 40C of the negative electrode external connection busbar 40 via the intermediate protector portion 30, which will be described below.

As shown in FIG. 6, a pair of second locking portions 22 are provided corresponding to the width of the intermediate protector portion 30, and lock the negative electrode external connection busbar 40 via the intermediate protector portion 30.

The second busbar holding portion 23 holds the positive electrode external connection busbar 50. The extending portion 24 is provided extending from the first busbar holding portion 21 in the width direction of the intermediate portion 40C of the negative electrode external connection busbar (a direction perpendicular to the arrow X direction in FIG. 6), and the locking pieces 25A and 25B (first locking pieces) are formed at opposite end portions of the extending portion 24. More specifically, as shown in FIG. 6, the locking piece 25A is located between the negative electrode external connection busbar 40 and the positive electrode external connection busbar 50, and the locking piece 25B is located on the outer side (the lower side in FIG. 6) of the negative electrode external connection busbar 40. Note that the positions of the locking pieces 25A and 25B are not limited to the positions shown in FIG. 6. Each of the locking pieces 25A and 25B couples the second protector portion 20, or in other words, the external connection busbar holding portion 2, to the electricity storage element group 60 by being engaged with the corresponding one of the above-described locking grooves 66 (see FIG. 2) formed in the electricity storage elements 61.

Thus, the second protector portion 20 is disposed so as to be spaced apart from the first protector portion 10, and holds the other end of the negative electrode external connection busbar (the first external connection busbar) 40 at one end portion thereof in a direction perpendicular to the direction in which the plurality of electricity storage elements are arranged (the arrow X direction in FIG. 6), and holds the positive electrode external connection busbar (the second external connection busbar) 50 at the other end portion thereof in the perpendicular direction.

The second protector portion 20 includes a pair of locking holes (an example of a "first engaged portion") 26 that are engaged with the pair of protruding pawl portions (first engaging portion) 75 of the insulating protector 71A described above. More specifically, the pair of locking holes 26 are formed in a bottom portion 24A of the extending portion 24 at positions corresponding to the pair of protruding pawl portions 75 (see FIG. 7).

The intermediate protector portion 30 is formed by an elastically deformable insulating member such as a synthetic resin, and is formed through extrusion molding in the present embodiment. The intermediate protector portion 30 holds the intermediate portion 40C of the negative electrode external connection busbar 40 between the first protector portion 10 and the second protector portion 20. At this time, the intermediate protector portion 30 holds the negative electrode external connection busbar 40 such that a portion of the upper surface of the negative electrode external connection busbar 40 is covered by edge portions 30A of the intermediate protector portion 30. One end of the intermediate protector portion 30 is held by the first protector portion 10 by the first locking portions 12, and the other end of the intermediate protector portion 30 is held by the second protector portion 20 by the second locking portions 22.

3. Method for Assembling Electricity Storage Module

When assembling the electricity storage module 100 according to the present embodiment described above, first, the two insulating protectors (71A, 71B) are coupled to each other by using the engaging portions 78 and the engagement receiving portions 79. Next, the busbars 80 are accommodated in the busbar holding portions 72 in each of the insulating protectors 71.

The busbar holding module 70 thus assembled is placed on the electrode arrangement surfaces 62 of the electricity storage element group 60. Then, the bolts 82 are coupled to the bolt holes 64 of each of the electricity storage elements 61 through the connection holes 81 of the busbars 80. Consequently, the positive electrode terminal 63A and the negative electrode terminal 63B of adjacent electricity storage elements 61 are connected to each other, and the busbar holding module 70 is attached to the electricity storage element group 60.

Then, the external connection busbar holding portion 2 in a state in which the negative electrode external connection busbar 40 and the positive electrode external connection busbar 50 are attached thereto is attached to the electricity storage element group 60 from above the busbar holding module 70. At this time, the locking pieces 15, 25A, and 25B of the external connection busbar holding portion 2 are engaged with the locking grooves 66 of the electricity storage elements 61 through the opening portions 74 of the busbar holding module 70. At this time, the pair of protruding pawl portions 75 of the insulating protector 71A are passed through the pair of locking holes 26 of the second protector portion 20 of the external connection busbar holding portion 2, and are locked to the bottom portion 24A of the extending portion 24 of the second protector portion 20 (see FIG. 10). Consequently, the second protector portion 20 is engaged with the insulating protector 71A. That is, the external connection busbar holding portion 2 is engaged with the busbar holding module 70. Note that the intermediate protector portion 30 is attached to the intermediate portion 40C of the negative electrode external connection busbar 40 before the negative electrode external connection busbar 40 is attached to the external connection busbar holding portion 2.

A bolt 82 is coupled to the bolt hole 64 of the negative electrode output terminal OUTN of the electricity storage element group 60 through the through hole 41 of the negative electrode external connection busbar 40, and a bolt 82 is coupled to the bolt hole 64 of the positive electrode output terminal OUTP of the electricity storage element group 60 through the through hole 51 of the positive electrode external connection busbar 50. Consequently, the external connection busbar holding portion 2 is attached to the electricity storage element group 60 from above the busbar holding module 70. Thus, an electricity storage module 100 as shown in FIG. 1 is completed.

Figure 9:
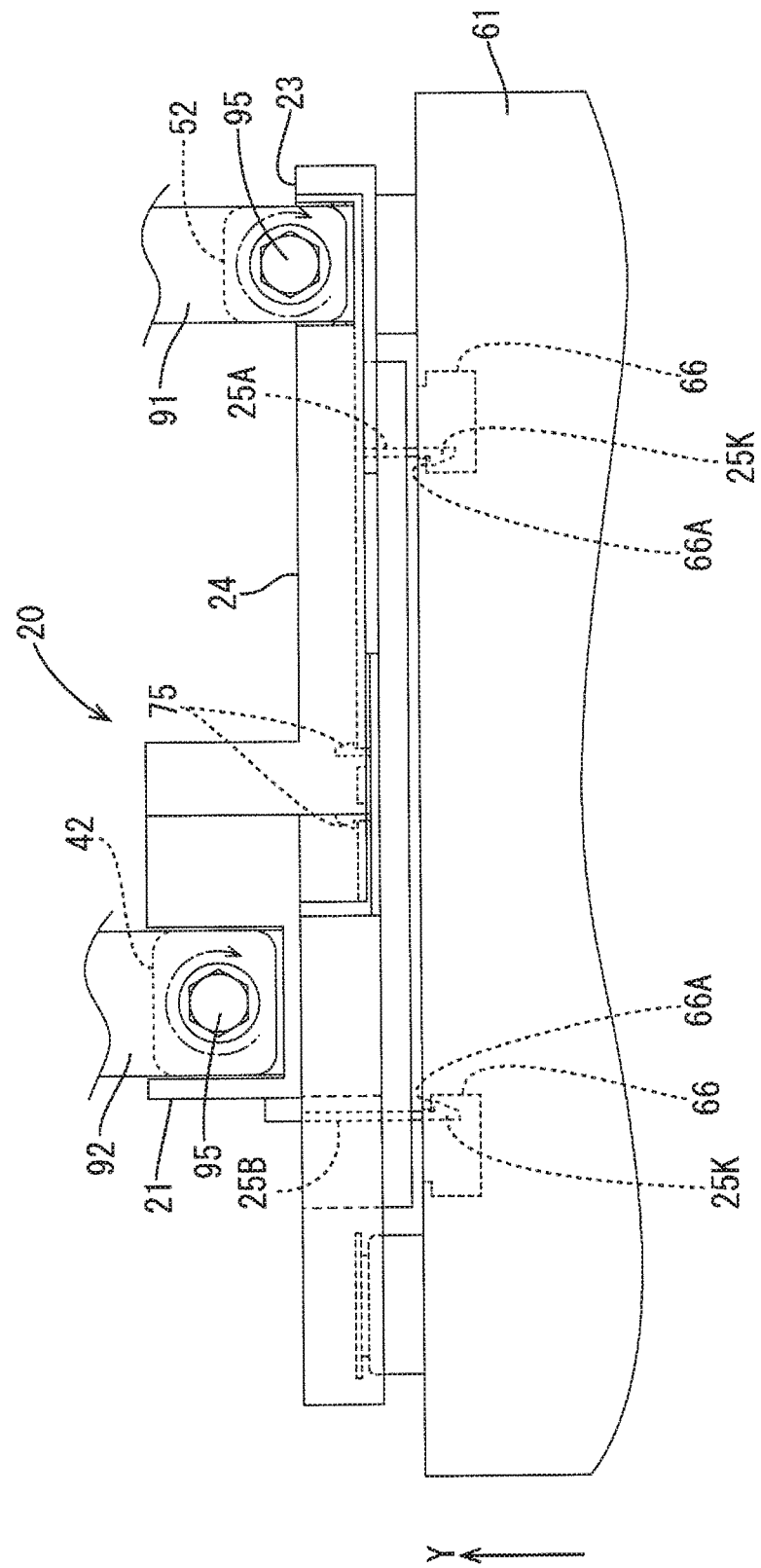
FIG. 9 is a side view showing a state in which the external device connection busbars are bolted to the electricity storage module.
Figure 10:
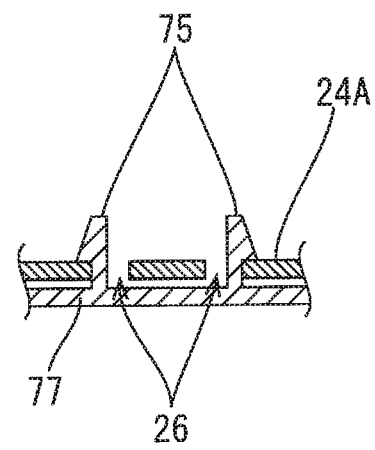
FIG. 10 is a cross-sectional view taken along the line A-A in FIG. 8.

Furthermore, as shown in FIGS. 8 and 9, in the electricity storage module 100, the external device connection busbar 92 and the external device connection busbar 91 are bolted to the first connection terminal portion 42 and the second connection terminal portion 52, respectively, by using bolts 95 (see FIG. 9).

4. Effects of Embodiment

In the above embodiment, in a configuration in which the external device connection busbar (external connection component) 91 is bolted to the other end of the second external connection busbar 50 that is held by the second protector portion 20, the pair of protruding pawl portions (first engaging portion) 75 that engage with the second protector portion 20 are disposed on the insulating protector 71A at positions closer to the negative electrode external connection busbar 40 than to the positive electrode external connection busbar 50 in a state in which the external connection busbar holding portion 2 is disposed on the busbar holding module 70. The pair of locking holes 26 are formed in the second protector portion 20 so as to correspond to the pair of protruding pawl portions 75.

Accordingly, even when a torque load is generated as the external device connection busbar 91 is bolted to the second connection terminal portion 52 of the second external connection busbar 50, it is possible to keep the second protector portion 20 from being moved by the rotational force resulting from the torque load. Consequently, it is possible to keep the torque load from affecting the elongated negative electrode external connection busbar 40 via the second protector portion 20. As a result, it is possible to maintain the reliability of connection between the negative electrode external connection busbar 40 and the negative electrode output terminal OUTN (63B).

That is, due to the torque load (see FIG. 9) generated as a result of rotating the bolts 95 during bolting, a rotational force acts on the first busbar holding portion 21 that is located at a position away from the second busbar holding portion 23 of the second protector portion 20. Accordingly, if the protruding pawl portions (first engaging portion) 75 and the locking holes (first engaged portion) 26 are not provided, it is possible that the first busbar holding portion 21 may be raised by that rotational force. When the first busbar holding portion 21 is raised, a torsional force is applied to the elongated negative electrode external connection busbar 40 along with the raising, and the torsional force is applied to the connection portion between the negative electrode external connection busbar 40 and the negative electrode output terminal OUTN (63B). There is concern that this may affect the reliability of the connection portion. However, according to the present embodiment, the pair of protruding pawl portions 75 and the pair of locking holes 26 can keep the first busbar holding portion 21 from being raised, and, consequently, it is possible to keep such a torsional force from being applied to the connection portion between the negative electrode external connection busbar 40 and the negative electrode output terminal OUTN.

In the above embodiment, the second protector portion 20 is engaged with the electricity storage element 61 by the first locking pieces (25A, 25B). Consequently, the second protector portion 20 is engaged with the electricity storage elements 61, and it is therefore possible to further keep the above-described torque load from affecting the negative electrode external connection busbar 40 via the second protector portion 20.

Furthermore, in the above embodiment, the first protector portion 10 is engaged with the electricity storage elements 61 by the second locking piece 15. Accordingly, the stability of the connection portion between the negative electrode external connection busbar 40 and the negative electrode output terminal OUTN is improved. This increases the reliability of connection between the negative electrode external connection busbar 40 and the negative electrode output terminal OUTN.

In the above embodiment, the pair of protruding pawl portions 75 formed on the insulating protector 71A constitute the first engaging portion, and the pair of locking holes 26 formed on the second protector portion 20 constitute the first engaged portion. Accordingly, the first engaging portion and the first engaged portion for engaging the second protector portion 20 with the busbar holding module 70 can be realized with a simple configuration.

Other Embodiments

The technique disclosed herein is not limited to the above described and illustrated embodiment. For example, the following embodiments are also included in the technical scope thereof.

Figure 11:
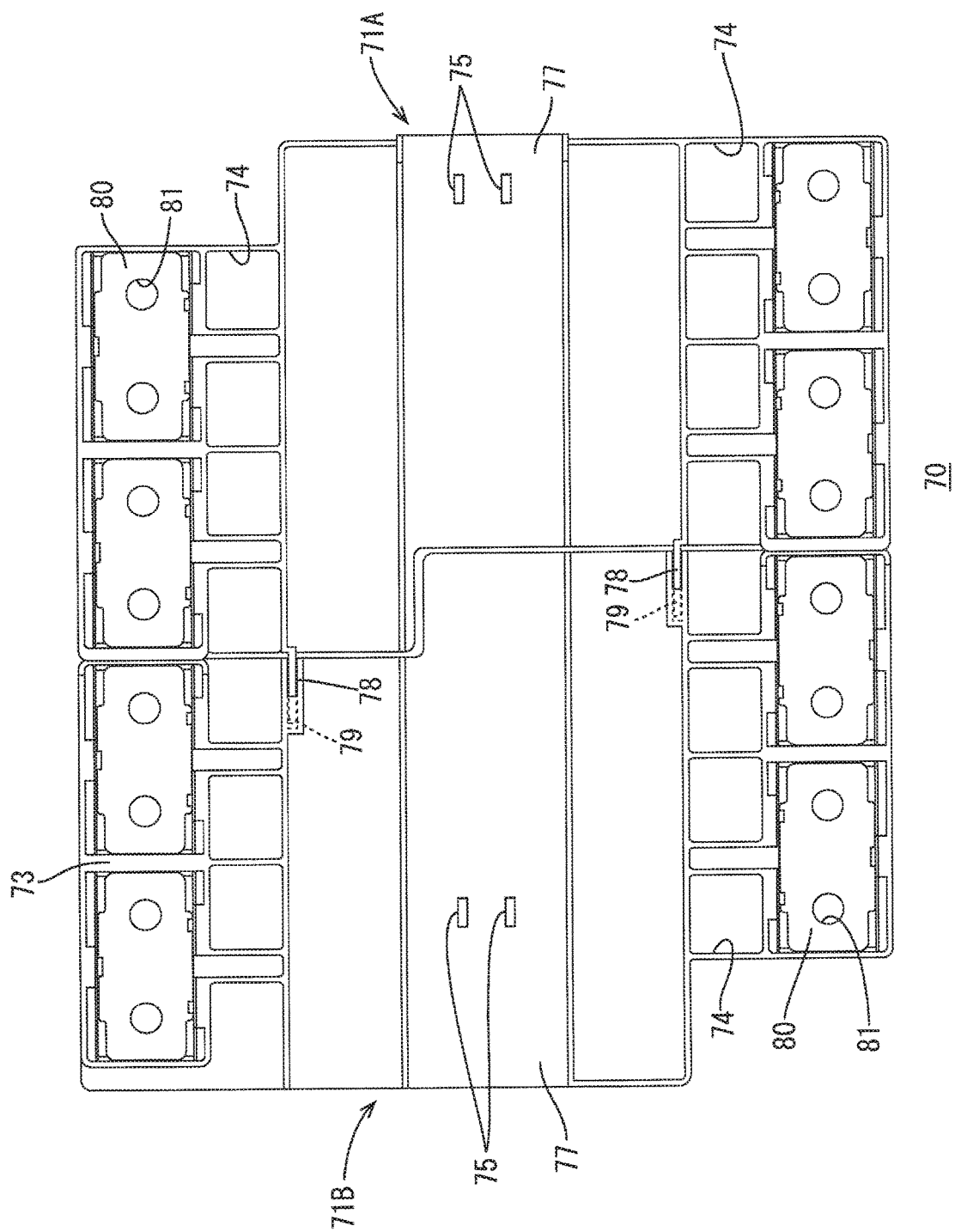
FIG. 11 is a plan view showing another example of the busbar holding module.

(1) In the above embodiment, an example is shown in which the pair of protruding pawl portions 75 are provided on one of the two insulating protectors 71, namely, the insulating protector 71A; however, the present disclosure is not limited thereto. As shown in FIG. 11, the pair of protruding pawl portions 75 (second engaging portion) may also be provided on the other insulating protector 71B. At this time, as shown in FIG. 12, the pair of locking holes 26 (second engaged portion) may also be provided in the extending portion 14 of the first protector portion 10. At this time, it is preferable that the pair of protruding pawl portions 75 are provided on the insulating protector 71B at positions closer to the negative electrode external connection busbar 40 than to the locking piece 15.

Note that when the pair of locking holes (second engaged portion) 26 are provided in the first protector portion 10 in this manner, the extending portion 14 may not necessarily be provided at a position closer to the negative electrode external connection busbar 40 than to the locking piece 15 as shown in FIG. 12. For example, conversely, the locking holes (second engaged portion) 26 may be provided at positions closer to the locking piece 15 than to the negative electrode external connection busbar 40, or may be provided at other locations of the first protector portion 10, without being provided in the extending portion 14. Simply put, it is sufficient that the first protector portion 10 has a configuration including the second engaged portions 26 that are engaged with the second engaging portions 75.

The configurations of the first and second engaging portions and the first and second engaged portions are not limited to the configurations of the pair of protruding pawl portions 75 and the pair of locking holes 26. For example, the first and second engaging portions may be formed by locking holes, and the first and second engaged portions may be formed by protruding pawl portions. The number of protruding pawl portions 75 and the number of locking holes 26 are not limited to two, and may each be one or three, for example.

(2) In the above embodiment, an example is shown in which the locking piece 15 is provided on the first protector portion 10, and the locking pieces 25A and 25B are provided on the second protector portion 20; however, the present disclosure is not limited thereto. For example, the locking piece 15 or the locking piece 25A may be omitted. Alternatively, all of the locking pieces 15, 25A and 25B may be omitted.

(3) In the above embodiment, an example is shown in which the connection of the busbars 80 to the electrode terminals 63 of the electricity storage elements 61, the connection of the negative electrode external connection busbar 40 to the negative electrode output terminal OUTN (63B), and the connection of the positive electrode external connection busbar 50 to the positive electrode output terminal OUTP (63A) are achieved through bolting using the bolts 82; however, the present disclosure is not limited thereto. For example, each of the connections may be achieved through laser welding. In that case, the through holes for bolting are omitted. Even in this case, it is possible to maintain the reliability of connection between the elongated external connection busbars and the output electrode terminals of the electricity storage element group.

(4) In the above embodiment, the shapes of the first protector portion 10 and the second protector portion 20 in plan view are not limited to those shown in FIG. 6. For example, although the first protector portion 10 includes the first locking portions 12, and the second protector portion 20 includes the second locking portions 22, the first locking portions 12 and the second locking portions 22 may be omitted.

(5) In the above embodiment, a configuration is described in which the external connection busbar protector 5 of the external connection busbar holding portion 2 is composed of three separate protectors, namely, the first protector portion 10, the second protector portion 20, and the intermediate protector portion 30, and the external connection busbar protector 5 is made into one piece by coupling the first protector portion 10 and the second protector portion 20 using the intermediate protector portion 30; however, the configuration of the external connection busbar protector 5 is not limited to this configuration. For example, the external connection busbar protector 5 may be formed by one synthetic resin protector in which a first protector portion 10, a second protector portion 20, and an intermediate protector portion 30 having the shapes in plan view shown in FIG. 6 are integrated as one piece. Even in this case, the external connection busbar protector 5 can be adapted to any power drawing position of the electricity storage element group 60 by modifying the length (shape) of the portion corresponding to the intermediate protector portion.

For a configuration in which the external connection busbar protector 5 is divided, the number of protectors is not limited to three, and may be two or four, for example.

Although an example is shown in which the locking holes (engaged portion) 26 are provided in the second protector portion 20, the present disclosure is not limited thereto. The locking holes 26 may be provided at any location of the external connection busbar protector 5. In this case, the protruding pawl portions (engaging portion) 75 may be provided on the insulating protector so as to correspond to the positions of the locking holes 26.

(6) In the above embodiment, an example is shown in which the negative electrode external connection busbar (the first external connection busbar) 40 has, as the elongated shape, a shape extending in the direction of arrangement of the plurality of electricity storage elements 61; however, the present disclosure is not limited thereto. For example, the negative electrode external connection busbar may have a shape extending in a direction perpendicular to the direction of arrangement of the plurality of electricity storage elements 61.

(7) In the above embodiment, an example is shown in which the protruding pawl portions (the first engaging portion) 75 are disposed at positions closer to the negative electrode external connection busbar (first external connection busbar) 40 than to the positive electrode external connection busbar (the second external connection busbar) 50, and the first locking piece (25A) of the second protector portion 20 is provided at a position closer to the positive electrode external connection busbar 50 than to the negative electrode external connection busbar 40; however, the present disclosure is not limited thereto. For example, conversely, the protruding pawl portions 75 may be disposed at positions closer to the positive electrode external connection busbar 50 than to the negative electrode external connection busbar 40, and the first locking piece (25A) may be provided at a position closer to the negative electrode external connection busbar 40 than to the positive electrode external connection busbar 50. Here, it is preferable that the first engaging portions 75 and the first locking pieces 25 are disposed between the negative electrode external connection busbar (the first external connection busbar) 40 and the positive electrode external connection busbar (the second external connection busbar) 50.

Note that the first engaging portions 75 and the first locking pieces 25 may not necessarily be disposed between the first external connection busbar and the second external connection busbar. For example, the first engaging portions 75 may be disposed between the first external connection busbar and the second external connection busbar, and the first locking pieces 25 may be disposed on the outer side (the lower side of the negative electrode external connection busbar 40 in FIG. 6) of the first external connection busbar, or vice versa. Alternatively, the first engaging portions 75 and the first locking pieces 25 may both be disposed on the outer side of one of the first external connection busbar and the second external connection busbar.

(8) In the above embodiment, an example is shown in which the second locking piece 15 is formed at the distal end portion of the extending portion 14 of the first protector portion 10 as shown in FIG. 6; however, the position where the second locking piece 15 is formed is not limited thereto. For example, the second locking piece 15 may be provided at the proximal end portion of the extending portion 14, or may be provided at another location of the first protector portion 10, rather than on the extending portion 14. Simply put, it is sufficient that the second locking piece 15 is also provided on the first protector portion 10.

LIST OF REFERENCE NUMERALS

1 Connection module
2 External connection busbar holding portion
5 External connection busbar protector
10 First protector portion (external connection busbar protector)
14 Extending portion
20 Second protector portion (external connection busbar protector)
26 Locking hole (first engaged portion)
30 Intermediate protector portion (external connection busbar protector)

40 Negative electrode external connection busbar (first external connection busbar)
50 Positive electrode external connection busbar (second external connection busbar)
60 Electricity storage element group
61 Electricity storage element
63 Electrode terminal
63A Positive electrode terminal
63B Negative electrode terminal
70 Busbar holding module
71, 71A, 71B Insulating protector
75 Protruding pawl portion (first engaging portion)
80 Busbar
91, 92 External device connection busbar (external connection component)
OUTN Negative electrode output terminal (first output electrode terminal)
OUTP Positive electrode output terminal (second output electrode terminal)

The invention claimed is:

1. A connection module that is configured to be attached to an electricity storage element group including a plurality of electricity storage elements each including positive and negative electrode terminals,
the electricity storage element group including a first output electrode terminal for outputting power of one polarity, and a second output electrode terminal for outputting power of the other polarity,
the connection module comprising:
a busbar holding module including a plurality of busbars configured to connect the positive electrode terminal and the negative electrode terminal of adjacent electricity storage elements to each other, and an insulating protector configured to hold the plurality of busbars; and
an external connection busbar holding portion that is disposed on the busbar holding module,
wherein the external connection busbar holding portion includes:
a first external connection busbar having an elongated shape, and one end that is configured to be connected to the first output electrode terminal, and another end to which an external connection component is to be connected;
a second external connection busbar having one end that is configured to be connected to the second output electrode terminal, and another end to which an external connection component is to be bolted; and
an external connection busbar protector configured to hold the first external connection busbar and the second external connection busbar,
the insulating protector includes a first engaging portion configured to be engaged with the external connection busbar protector, and
the external connection busbar protector includes a first engaged portion configured to be engaged with the first engaging portion, wherein, with respect to a plan view of the connection module,
a bottom surface of the external connection busbar protector having the first engaged portion is superposed with a surface of the insulating protector having the first engaging portion.

2. The connection module according to claim 1, wherein the first engaged portion comprising a locking hole, and
the first engaging portion includes a protruding pawl portion configured to pass through the locking hole, and to be locked to the external connection busbar protector.

3. The connection module according to claim 1, wherein the external connection busbar protector includes:
a first protector portion configured to hold the one end of the first external connection busbar; and
a second protector portion configured to hold the other end of the first external connection busbar at one end portion thereof in a direction perpendicular to a direction of arrangement of the plurality of electricity storage elements, and to hold the second external connection busbar at another end portion thereof in the perpendicular direction,
the first engaging portion is engaged with the second protector portion, and
the second protector portion includes the first engaged portion.

4. The connection module according to claim 3, wherein the first engaging portion is disposed between the first external connection busbar and the second external connection busbar in a condition in which the external connection busbar holding portion is disposed on the busbar holding module, and
the second protector portion includes a first locking piece configured to be engaged with a locking groove formed in one of the electricity storage elements.

5. The connection module according to claim 4, wherein the first protector portion includes a second locking piece configured to be engaged with a locking groove formed in one of the electricity storage elements.

6. The connection module according to claim 5, wherein the insulating protector includes a second engaging portion configured to be engaged with the first protector portion, and
the first protector portion includes a second engaged portion configured to be engaged with the second engaging portion.

7. The connection module according to claim 3, wherein the external connection busbar protector includes an intermediate protector portion configured to hold the first external connection busbar,
the first protector portion, the second protector portion, and the intermediate protector portion are separate members, and
the external connection busbar protector is assembled into one piece by coupling the first protector portion and the second protector portion using the intermediate protector portion.

* * * * *